(12) United States Patent
Jahr (10) Patent No.: US 11,537,621 B2
(45) Date of Patent: Dec. 27, 2022

(54) CONTENT METADATA SERVICE FOR LIFECYCLE MANAGEMENT OF DIGITAL CONTENT

(71) Applicant: SAP SE, Walldorf (DE)

(72) Inventor: Andreas Jahr, Karlsruhe (DE)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 16/899,703

(22) Filed: Jun. 12, 2020

(65) Prior Publication Data

US 2021/0390107 A1    Dec. 16, 2021

(51) Int. Cl.
  *G06F 16/00* (2019.01)
  *G06F 16/2457* (2019.01)
  *G06F 16/248* (2019.01)
  *G06F 16/84* (2019.01)
  *G06F 16/907* (2019.01)
  *G06F 16/28* (2019.01)
  *H04L 67/06* (2022.01)

(52) U.S. Cl.
  CPC ...... *G06F 16/24573* (2019.01); *G06F 16/248* (2019.01); *G06F 16/284* (2019.01); *G06F 16/86* (2019.01); *G06F 16/907* (2019.01); *H04L 67/06* (2013.01)

(58) Field of Classification Search
  CPC ............. G06F 16/24573; G06F 16/907; G06F 16/284; G06F 16/86; G06F 16/248; H04L 67/06
  USPC .................................................. 707/600–899
  See application file for complete search history.

(56) References Cited

U.S. PATENT DOCUMENTS

| | | | | |
|---|---|---|---|---|
| 8,527,369 B1 * | 9/2013 | Yalamanchi | ....... | G06Q 30/0641 705/27.1 |
| 2006/0101423 A1 * | 5/2006 | Aharoni | .................. | G06F 16/86 717/136 |
| 2009/0204567 A1 * | 8/2009 | Barrow | ................. | G06F 40/154 |
| 2009/0204943 A1 * | 8/2009 | Konduri | .................... | G06F 8/51 717/114 |
| 2012/0203782 A1 * | 8/2012 | Olston | .................... | G06F 16/25 707/E17.046 |
| 2013/0254237 A1 * | 9/2013 | Agarwal | ................. | G06F 16/00 707/792 |
| 2015/0089475 A1 * | 3/2015 | Geng | ........................ | G06F 8/71 717/121 |
| 2020/0034484 A1 * | 1/2020 | Arora | ................ | G06F 16/24573 |
| 2021/0271636 A1 * | 9/2021 | Watanabe | ............. | G06F 16/353 |

* cited by examiner

*Primary Examiner* — Michelle N Owyang
(74) *Attorney, Agent, or Firm* — Fish & Richardson P.C.

(57) ABSTRACT

Methods, systems, and computer-readable storage media for receiving, by a content transfer service of a content management system and from a source system, a first content file comprising first content and first content metadata, the first content metadata being stored in a first format, processing the first content file using a set of metadata retrieval definitions to extract file-type-specific metadata from the first content metadata and map at least a portion of the file-type-specific metadata to a first uniform content metadata file having a second format that is different from the first format, each metadata retrieval definition comprising a computer-executable, declarative procedure, and transferring, by the content transfer service, the first content file and the first uniform content metadata file to a target system, the target system consuming the content at least partially based on the first uniform content metadata file.

20 Claims, 5 Drawing Sheets

CONTENT METADATA SERVICE FOR LIFECYCLE MANAGEMENT OF DIGITAL CONTENT

BACKGROUND

Enterprises can use software systems to support and execute operations. In many cases, enterprises can use hundreds to thousands of software systems across a landscape. In some instances, software systems execute within a target system and consume digital content from a source system. In this context, content lifecycle management (content LM) can describe the development of content in a source system and exporting of the content from the source system to a target system. In this manner, the content is physically transmitted to the target system. In some examples, the target system can be described as a content runtime, in which the content is interpreted and executed by an application to provide some functionality. The content can be stored in a computer-readable file (content file), which is transferred from the source system to the target system. The transfer of the content file is organized by a content transfer service, which can be provided as part of a content management system.

Content metadata, which provides information about the content, is already explicitly included in the content file, such that the content file is self-contained (i.e., content file=content+content metadata). In order to use the content metadata, the content metadata is extracted from the content file. Extraction of the content metadata is sought to be as simple as possible and extensible, because new types of content can appear at any time and/or content providers may change their metadata format. However, because of the disparities across source systems (e.g., authoring environments, content repositories), it could be required that each source system exposes content metadata in a uniform format in order to participate in content transfer through the content transfer system. This can be difficult, particularly in instances of a significant number of different source systems. Absent uniform content metadata from each source system, existing approaches implement import interfaces and/or export interfaces that are extended to handle disparate content metadata formats. This requires significant coding effort (e.g., coding extensions to importers/exporters) and consumption of technical resources (e.g., converting extracted content metadata). In addition, the import and export application programming interfaces (APIs) of such content files are various. For example, each content runtime not only has their own content metadata format, but also their proprietary set of export and import APIs.

SUMMARY

Implementations of the present disclosure are directed to lifecycle management of digital content. More particularly, implementations of the present disclosure are directed to a content metadata service for lifecycle management of digital content.

In some implementations, actions include receiving, by a content transfer service of a content management system and from a source system, a first content file comprising first content and first content metadata, the first content metadata being stored in a first format, processing the first content file using a set of metadata retrieval definitions to extract file-type-specific metadata from the first content metadata and map at least a portion of the file-type-specific metadata to a first uniform content metadata file having a second format that is different from the first format, each metadata retrieval definition comprising a computer-executable, declarative procedure, and transferring, by the content transfer service, the first content file and the first uniform content metadata file to a target system, the target system consuming the content at least partially based on the first uniform content metadata file. Other implementations of this aspect include corresponding systems, apparatus, and computer programs, configured to perform the actions of the methods, encoded on computer storage devices.

These and other implementations can each optionally include one or more of the following features: the set of metadata retrieval definitions includes a file type identification definition, a metadata discovery definition, a metadata reader definition, and a metadata mapping definition; the content management system includes a content file provider within the content transfer system and a content file metadata service that stores the set of metadata retrieval definitions, the content file provider communicating with the content file metadata service for processing the content file using the set of metadata retrieval definitions; actions further include receiving a second content file comprising second content and second content metadata, the second content metadata being stored in a third format, and processing the second content file using the set of metadata retrieval definitions to provide a second uniform content metadata file having the second format that is different from the third format; the metadata retrieval definition is determined for the first content file based on a file type and a content type of the first content file; the file-type-specific metadata is transferred to the target system with the first content file; and the source system includes one of a content repository and a content authoring environment.

The present disclosure also provides a computer-readable storage medium coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that methods in accordance with the present disclosure can include any combination of the aspects and features described herein. That is, methods in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

DESCRIPTION OF DRAWINGS

Like reference symbols in the various drawings indicate like elements.

DETAILED DESCRIPTION

Implementations of the present disclosure are directed to lifecycle management of digital content. More particularly, implementations of the present disclosure are directed to a content metadata service for lifecycle management of digital content. Implementations can include actions of receiving, by a content transfer service of a content management system and from a source system, a first content file comprising first content and first content metadata, the first content metadata being stored in a first format, processing the first content file using a set of metadata retrieval definitions to extract file-type-specific metadata from the first content metadata and map at least a portion of the file-type-specific metadata to a first uniform content metadata file having a second format that is different from the first format, each metadata retrieval definition comprising a computer-executable, declarative procedure, and transferring, by the content transfer service, the first content file and the first uniform content metadata file to a target system, the target system consuming the content at least partially based on the first uniform content metadata file.

Implementations of the present disclosure are described in further detail herein with reference to an example content management service that enables the transfer of content (also referred to herein as digital content) from a source system, where the content is developed (e.g., created, tested) to a target system, where the content is consumed (e.g., production use within an application). The example content management service includes SAP API Business Hub provided by SAP SE of Walldorf, Germany, which enables discovery and consumption of digital content packages with application programming interfaces (APIs), pre-packaged integrations, and applications (e.g., provided from SAP and/or partner vendors). It is contemplated, however, that implementations of the present disclosure can be realized with any appropriate content management system.

To provide further context for implementations of the present disclosure, enterprises can use software systems to support and execute operations. In some instances, software systems (also referred to as applications herein) execute within a target system and consume digital content from a source system. In this context, content lifecycle management (content LM) can describe the development of content in a source system and exporting of the content from the source system to a target system. In this manner, the content (a copy of the content) is physically transmitted to the target system. In some examples, the target system can be described as a content runtime, in which the content is interpreted and executed by an application to provide some functionality.

Typically, source systems are provided as cloud tenants having the role of a development tenant, in which the content is developed (e.g., created, tested). Target systems are typically provided as cloud tenants that have the role of a production tenant, in which the content is productively used in the context of the application. Further, the technical basis for the content is a file transfer as the simplest possible and generally available technical abstraction of content for different content types. That is, the content can be stored in a computer-readable file, which is transferred from the source system to the target system. Example file types can include, without limitation, .zip, .jar, .pdf, .jpeg, and the like.

The transfer of content is organized by a content transfer service, which can be provided as part of a content management system (e.g., SAP API Business Hub, introduced above). In some examples, the content transfer service enables routes between source systems and target system to be defined, provides transfer queues of content files (i.e., the order) and metadata of the (to-be) transferred content filed. The content transfer service is typically, instantiated for each enterprise (e.g., customer that uses the content transfer service). Thus, from a service provider perspective, there can be many service instances (instances of the content transfer service) world-wide.

By way of non-limiting example, example content can include iFlows for SAP Cloud Platform Integration (CPI) provided by SAP SE. In this example, content can include a definition as to how messages from a first system are mapped to the format of a second system. In some examples, the content (e.g., definition of message flows) is developed and tested in one CPI tenant (source system) and is then physically transferred (copied) to the production tenant (target system). In the production tenant, which executes the first system (e.g., first application) messages are received as part of operations, and the content is used to map messages and pass messages to one or more second systems (e.g., second applications).

From the perspective of content LM, it is advantageous for an administrator (e.g., admin of the target system) to have available uniform metadata about the transferred content files. In this manner, the semantics of the content file under transfer can be understood, and the overview and quality of content deliveries can be maintained beyond the abstraction level of just content files. Example metadata (also referred to herein as content metadata) can include, without limitation, date (e.g., content created, content saved to file), content object lists, names and/or identifiers (IDs) of the content aggregated to a content file, version of the content, and type of the content. For example, and in terms of overview and quality of content deliveries, instead of relying on a date associated with a content file to determine whether the content within the content file corresponds to a require version, having the version of the content within the content file is ideal (e.g., although the date indicate that the content is recently created, the content may be in a format that corresponds to a previous version and not a current version as required for processing in the target system).

Typically, all of the content metadata is already explicitly included in the content file, such that the content file is self-contained (i.e., content file=content+content metadata). In the case of object lists, an object list is implicitly provided by the structure of the content inside of the content file. In order to use the content metadata, the content metadata is extracted from the content file. Extraction of the content metadata is sought to be as simple as possible and extensible, because new types of content can appear at any time and/or content providers may change their metadata format.

In content management systems, content can be provided from multiple, disparate source systems (e.g., authoring environments, content repositories). It can be difficult to require that each source system exposes content metadata in a uniform format in order to participate in content transfer through the content transfer system. This can be difficult, particularly in instances of a significant number of different source systems. Absent uniform content metadata from each source system, existing approaches implement import interfaces and/or export interfaces that are extended to handle disparate content metadata formats (e.g., an import/export interface that is specific to each source system). This requires significant coding effort (e.g., coding extensions to importers/exporters) and consumption of technical resources (e.g., converting extracted content metadata for each of multiple source systems).

Implementations of the present disclosure address this issue in consideration of the following example technical problems. One example technical problem is how to add new content file types (and thus new content metadata structures) without having to change the code at the content transfer service for the extraction. Another example technical problem is how to decouple the metadata creation (at the source system) from its extraction at the content transfer service, such that content providers can change the metadata structure without impacting the content transfer service. Still another example technical problem is how to support the metadata extraction of content file types for which the metadata structure is not defined by the source system, but is instead defined by a standard (e.g., binary standard files like .jpeg image files). This technical problem becomes even more apparent, if the source system (e.g., authoring environment) of the content is not developed by the content runtime executing and using the content files, and thus content metadata is created by software components that are black-box. Still another example technical problem is that the APIs for the import and export of the content files to and from the content services (i.e., the location at which content of one content type resides, e.g. the content runtime) vary. Thus, any implementation of a content transfer service either means dedicated implementations for each of content service import/export APIs or forcing the content services to adopt a standard API.

In view of this, and as described in further detail herein, implementations of the present disclosure provide a content metadata service for lifecycle management of digital content. In some implementations, a content file provider is included in a content transfer service and communicates with a content file metadata service, which includes metadata retrieval definitions. In some examples, the metadata retrieval definitions are used to provide content metadata of content files in a uniform format (also referred to as standard format). That is, regardless of the type of the content file, the content metadata is extracted therefrom and at least a portion of the content metadata populates uniform content metadata that can be provided to a target system with the content file.

Figure 1:
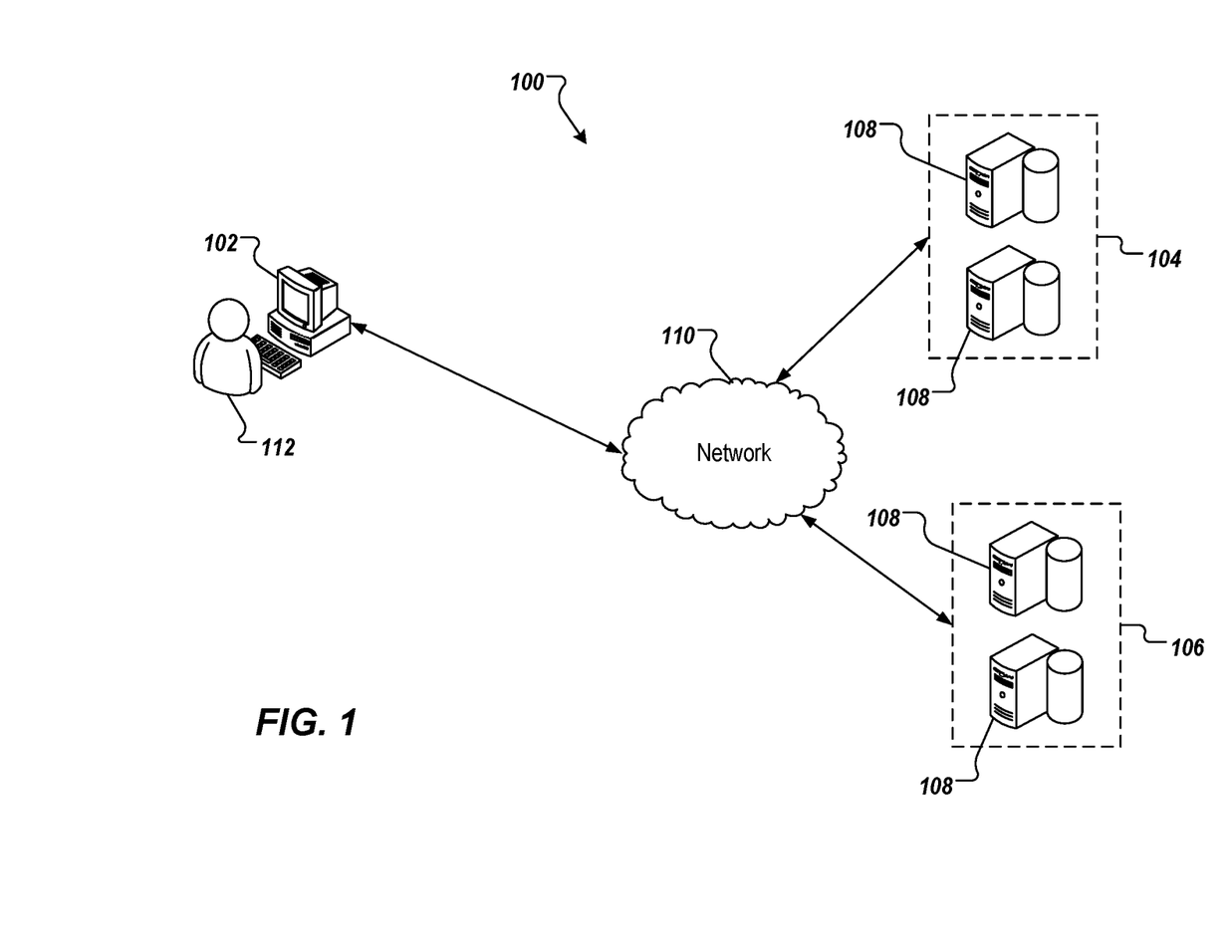
FIG. 1 depicts an example architecture that can be used to execute implementations of the present disclosure.

FIG. 1 depicts an example architecture 100 in accordance with implementations of the present disclosure. In the depicted example, the example architecture 100 includes a client device 102, a network 110, and server systems 104, 106. The server systems 104, 106 each include one or more server devices and databases 108 (e.g., processors, memory). In the depicted example, a user 112 interacts with the client device 102.

In some examples, the client device 102 can communicate with the server system 104 and/or the server system 106 over the network 110. In some examples, the client device 102 includes any appropriate type of computing device such as a desktop computer, a laptop computer, a handheld computer, a tablet computer, a personal digital assistant (PDA), a cellular telephone, a network appliance, a camera, a smart phone, an enhanced general packet radio service (EGPRS) mobile phone, a media player, a navigation device, an email device, a game console, or an appropriate combination of any two or more of these devices or other data processing devices. In some implementations, the network 110 can include a large computer network, such as a local area network (LAN), a wide area network (WAN), the Internet, a cellular network, a telephone network (e.g., PSTN) or an appropriate combination thereof connecting any number of communication devices, mobile computing devices, fixed computing devices and server systems.

In some implementations, each of the server systems 104, 106 includes at least one server and at least one data store. In the example of FIG. 1, the server systems 104, 106 are intended to represent various forms of servers including, but not limited to a web server, an application server, a proxy server, a network server, and/or a server pool. In general, server systems accept requests for application services and provides such services to any number of client devices (e.g., the client device 102 over the network 106).

In accordance with implementations of the present disclosure, and as noted above, the server system 104 can host one or more source systems (e.g., content authoring system, content repository) that are used to develop content, and the server system 106 can host one or more target systems, to which content is to be transferred. In some examples, a content management system can be hosted within the example architecture (e.g., by the server system 104, the server system 106, or another server system (not shown)) to facilitate content metadata management in accordance with implementations of the present disclosure. Further, the content management system can include a content transfer system that enables content transfer from a source system to a target system, as described herein.

Figure 2:
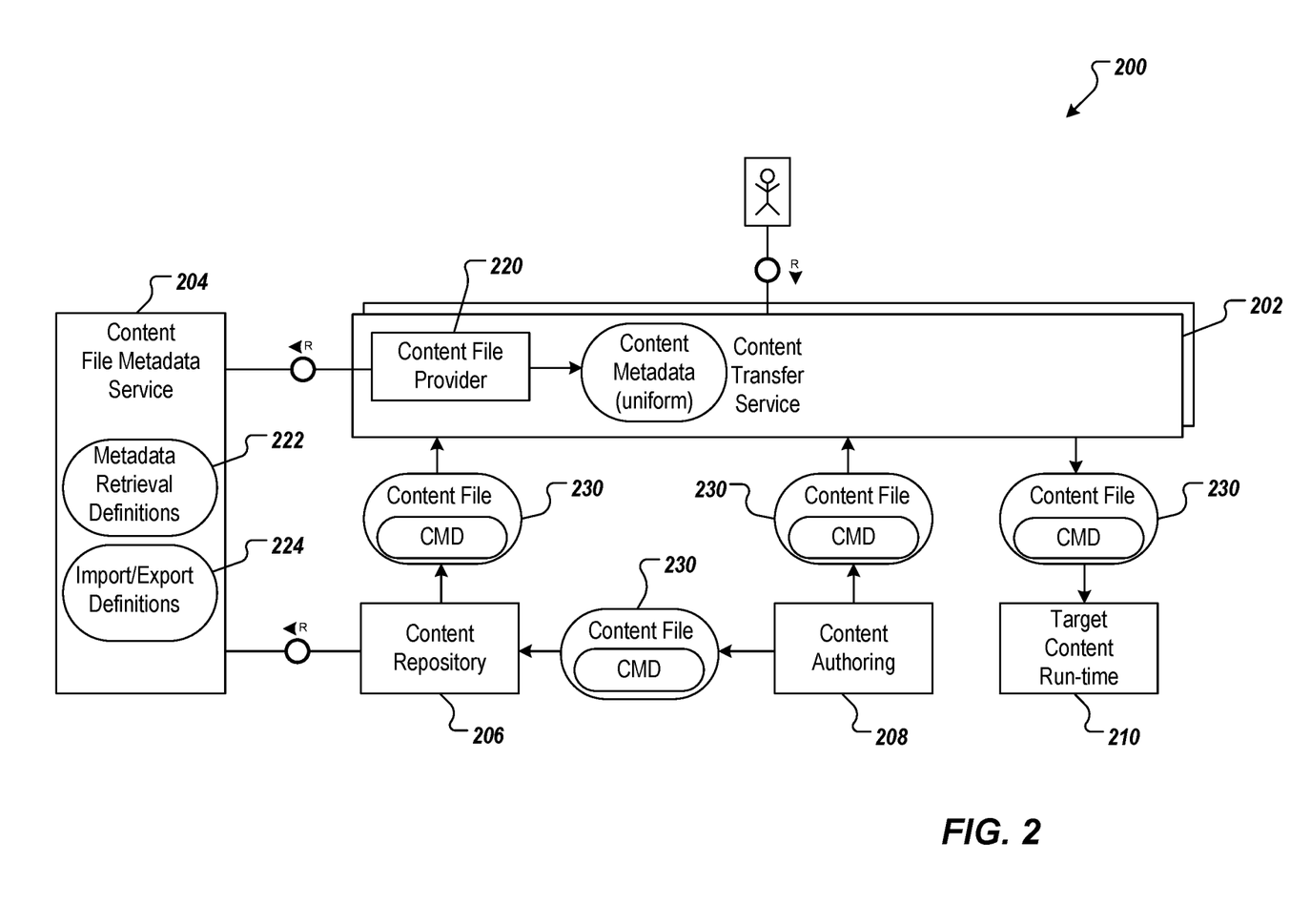
FIG. 2 depicts an example conceptual architecture for lifecycle management of content in accordance with implementations of the present disclosure.

FIG. 2 depicts an example conceptual architecture 200 for lifecycle management of content in accordance with implementations of the present disclosure. The example conceptual architecture 200 includes a content transfer service instance 202, a content file metadata service 204, a content repository 206, a content authoring environment 208, and a target content run-time 210. In the example of FIG. 2, the content transfer service instance 202 includes a content file provider 220, and the content file metadata service 204 includes metadata retrieval definitions 222 and import/export definitions 224. In some examples, the content file provider 220, and the content file metadata service 204 communicate through a representational state transfer (REST)-ful connection. In implementations, the content file provider 220 retrieves and executes definitions from the content file metadata service 204 to provide content metadata in a uniform format and to import/export content files from/to specific import/export APIs of the content repositories 206, content authoring 208, content runtimes 210, and the content transfer service 202. In some examples, the content transfer service instance 202 and the content file metadata service 204 are provided as part of a content management system. The content repository 206 may use the same content file provider 220 and exhibit the same or similar interaction with the content file metadata service 204 in order to receive/import content from content authoring 208. This reuse of the content file provider 220 is not depicted explicitly at the content repository 220.

In some implementations, the content transfer service instance 202 facilitates content file transfer from one or more of the content repository 206 and the content authoring environment 208 (as source systems) to the a target content run-time 210. In some examples, multiples of the content transfer service instance 202 can be provided, each instance corresponding to a respective target content run-time (e.g., target content run-times of different customers).

In further detail, the content authoring environment 208 can be used to develop content that is encapsulated with respective content metadata (CMD), in a content file 230. As introduced above, the content file 230 can be of a type of multiple types, each type storing CMD in a respective format. In general, the content file 230 can be a structured text file (e.g., xml, .json, .yaml), a binary file (e.g., a sequence of bytes, such as .jpeg), or a tree of files (e.g., directories, such as .jar, .tgz). For example, a content file 230 can be of a .jpeg type and contains binary data across several segments. Each segment is delimited by markers (two-byte codes in hexadecimal). In a .jpeg content file, content metadata (CMD) is stored in the so-called APPn segment (e.g., marker 0xFF, 0xEn). As another example, a content file 230 can be of a .jar type (an archive file format) and contains a manifest file (e.g., manifest.mf) within which metadata (e.g., name-value pairs organized in sections) is stored (e.g., file hierarchy).

The content file 230 is provided to the content repository 206 for storage therein. In some examples, and as described in further detail herein, the content file 230 can be transferred to the target content run-time 210 from the content environment 210 and/or the content repository 208 through the content transfer service instance 202.

In accordance with implementations of the present disclosure, the content file metadata service 204 provides uniform content metadata for content files that are to be transferred through the content transfer service instance 202. In some implementations, the content transfer service 202 processes content files using the metadata retrieval definitions 222 of the content file metadata service 204 to provide the uniform content metadata. The uniform content metadata is provided in a uniform format (also referred to as uniform structure, or standard structure) that is different from a format of the content metadata in the content file 230.

Figure 3A:
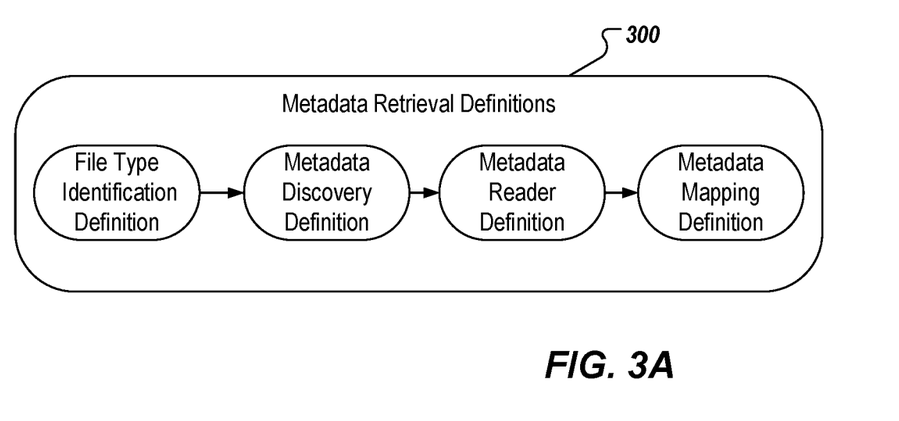
FIGS. 3A and 3B depicts example metadata retrieval definitions and processing in accordance with implementations of the present disclosure.
Figure 3B:
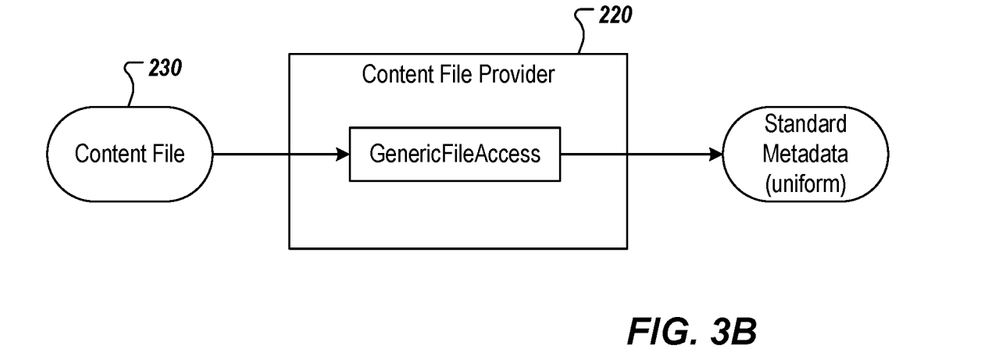

FIG. 3A depicts example metadata retrieval definitions 300 in accordance with implementations of the present disclosure. The example metadata retrieval definitions 300 (e.g., depicted as the metadata retrieval definitions 222 in FIG. 2) include a file type identification definition, a metadata discovery definition, a metadata reader definition, and a metadata mapping definition. In some implementations, each of the metadata retrieval definitions is provided as a declarative procedure (a computer-executable procedure) and that are applied in sequence (indicated by arrows between the definitions) by the content file provider 220 to the content file 230. FIG. 3B represents processing of content file 230 by the content file provider 220 to provide a standard metadata (e.g., the Content Metadata (uniform) of FIG. 2).

In some examples, the file type identification definition is applied to determine the file type (e.g. by file extension, magic number, file type version). The input to the file type identification definition is the content file 230, and the output is the file type (e.g., .jpeg, .pdf) of the content file. For example, the file type identification definition reads the file extension provided in a file name of the content file, maps the file extension to a file type in a set of file types, and outputs the file type. Here, it can be noted that implementations of the present disclosure enable content file providers to be as static as possible (e.g., executing only atomic operations) and keep any variability within the central (global) metadata service. In addition, it is avoided to inefficiently pass all content files for metadata inspection in their entirety to the content metadata service, because this is too resource intensive for high volumes of content files and content file sizes up to single digit gigabytes, for example.

In some examples, the metadata discovery definition is applied to find and extract the metadata within the content file 230 (e.g. the meta-inf file in .jar, a certain sequence of bytes enclosed with delimiter tags within a binary file). The input to the metadata discovery definition is the file type (from the file type identification definition) and the content file 230, and the output is a data snippet that represents the entirety of required metadata. For example, if the file type is .jpeg, the metadata discovery definition reads metadata within the APPn segment (e.g., marker 0xFF, 0xEn) and provides a data snippet that includes the metadata.

In some examples, the metadata reading definition is applied to structure the previously retrieved metadata (i.e., the data snippet from the metadata discovery definition) to the file-type-specific metadata. That is, the metadata reading definition is applied to decompose a sequence of bytes provided in the data snippet into metadata property strings. The input to the metadata reading definition is file type and the data snippet, and the output is file-type-specific name-value pairs of the metadata. In some examples, from the identification of the file type and the content type, the metadata reading definition is provided, which defines which atomic operations must be used to find the desired metadata. Non-limiting examples for finding the content version is provided as follows:

binary file: offset x bytes from the beginning of the metadata snippet and read the next 10 bytes. Typecast the bytes array to a string of format <major>.<minor>.<patch>.

text file (e.g. a yaml file): search for the node "version" at the node path "myconent/metadata". The value is of the node is a string of <major>.<minor>.<patch>.

file tree (e.g. zip file): retrieve the file metadata.inf from ./ (i.e. the directory root of the zip file). Then treat the metadata file like a text file (s. example of the previous example for details.

In some examples, the metadata mapping definition is applied to map the file-type-specific metadata to a uniform metadata structure expected by the content transfer service. The input to the metadata mapping definition is the file type and the file-type-specific name-value pairs of the metadata, and the output is content-transfer-specific metadata. That is, the output is provided as at least a portion of the content metadata of the content file 230 in the uniform format.

In some examples, mapping is split into two aspects: the metadata value mapping and the metadata name mapping. Value mapping means that the retrieved metadata values are transformed to the desired format. For example, the version value can be encoded as 3 consecutive bytes with each byte representing a version number. The typical representation of the version for this file type is <major>.<minor>.<patch>. Thus the value mapping rule defines that the 3-byte-sequence <byte1><byte2><byte3> is mapped to a string <str(int(byte1)>.<str(int(byte2)>.<str(int(byte2)>. Another example is the conversion of dates to the desired format regardless of the content-specific technical encoding. Metadata type name mapping means that existing that the metadata with the content-specific property name are mapped to the content transfer service metadata property name. An example is that the content has defined the name of the version property with createDate. The name mapping defines the rule that the value of createDate (after having applied the metadata value mapping rule) is added to the date property expected by the content transfer service.

In accordance with implementations of the present disclosure, and as described herein, the content transfer service enables content metadata to be determined from each content file and to be stored in a content metadata file having a uniform format (e.g., the "Content Metadata (uniform)" of FIG. 2). That is, regardless of the type of file that the content file is provided as, the resulting content metadata file is in the same format as all other content metadata files provided for other content files.

As described herein, implementations of the present disclosure enable new content file types (and thus new metadata structures) to be processed without having to change the code within the content transfer service to provide a uniform content metadata file. For example, implementations of the present disclosure exploit the fact that content files are either structured text files, binary files, or trees of files. Accordingly, for each file type, a relatively limited, invariant set of atomic technical operations (file type access primitives) can be performed to access the file. In view of this, implementations of the present disclosure split the access to the content metadata within the content file into these atomic technical file type access primitives (e.g., read metadata from x number of bytes starting at the byte position y within the content file) and a metadata retrieval definition (e.g., get a number of bytes, the first two bytes are to be mapped to a string and represent a version number, the next 10 bytes is content ID, etc.). Both, the atomic technical file type access primitives and the retrieval definition are implemented once and do not change (e.g., because the technical file types have been stable for decades and remain stable for the foreseeable future).

As described herein, implementations of the present disclosure decouple the metadata creation (e.g., within the source system) from extraction of the metadata at the content transfer service. In this manner, content providers can change the metadata structure without impacting operation of the content transfer service. As described herein, this is achieved by splitting extraction of the content metadata into two components, namely, the content file provider 220 (library) of the content transfer service 202, and the content file metadata service 204 (connected through a REST-ful remote communication). The library (the content file provider 220) is embedded into the content transfer services and implements the technical file type access primitives. The service (the content file metadata service 204) implements the metadata retrieval definitions. For any new file type or file type metadata structure change, a new metadata retrieval definition is provided and the metadata can be extracted, as described herein. However, if a new file type is not supported (i.e., no definition is available within the content file metadata service 204), no metadata is extracted.

As described herein, implementations of the present disclosure support extraction of metadata of arbitrary content file types, since any content file is typically either a binary file, a text file, or a zipped file (that again contains binary or text files). For these 3 file types, atomic and thus immutable operations are defined and implemented in the content file provider 220. The retrieval definitions define which of the atomic operations shall be executed for the content file at hand. The content file metadata service 204 thus will never need access to the file. Enabling the content transfer service for new content file types, remains a matter of adding new definitions to the content file metadata service. So, no code changes or deployment of content file read plug-ins at the content file metadata service or the content file provider. In some implementation it is also possible to execute the atomic operations that only require a metadata snippet on the content file metadata service 204 and reduce the content service provider implementation to only atomic operations that need access to the entire file (e.g. to extract a metadata snipped from a content file).

From the perspective of the content file, this means that only the library (the content file provider 220) has direct access to the content file 230. The access is on the level of the technical file type (e.g., binary, zipped folder, text, etc.) in order to extract just the data structure that bears the metadata (e.g., sequence of bytes, metadata file, etc.). The technical metadata structure is transferred to the service (the content file metadata service) that has a metadata extraction description of how to render the technical structure into metadata data, the mapping to the content LM related metadata structure. Further, because the technical file types do not change, the content transfer service remains unchanged regardless of the content type. New content types translate to a new metadata extraction description using primitives specific for a technical file type. Consequently, the content file metadata service also does not change.

Implementations of the present disclosure also address import and export of content files. In some examples, export and import of content files are typically a sequence of REST calls, in general about file operations. The exporter (e.g., source system) and/or the importer (e.g., target system) of the content files typically have proprietary APIs, through which the content files can imported/exported. More recently, there has been a move toward use of standard APIs. Instead of providing an API-specific REST client at the content transfer service 202 (directly embedded in the Content Transfer Service or via a plug-in infrastructure) or asking 206, 208 or 210 to provide a standard API known to 202, a generic file access component is implemented at the Content File Provider 220. Similar to the metadata extraction, the import/export of a content file via API is broken down to atomic REST call operations and particles.

Communication can be performed using a set of atomic operations. Example atomic operations include, without limitation, GetFile ( ), PutFile ( ), GetFileMetadata ( ), PutFileMetadata ( ), MonitorFileExport/Import ( ), GetError ( ), and GetLogs ( ). For each atomic operation, a set of metadata and control structures (import/export definitions 224) is defined and persisted at the content file metadata service 204. For Each import or export target system type (i.e., content repositories 206, content authorings 208, content runtimes 210 exposing a specific API), the required atomic REST operations are defined and arranged in the required execution sequence (e.g. GetFile( ) and then MonitorFileExport( ).

On the technical side, communication is typically conducted using the hypertext transfer protocol (HTTP). Content files can be handled with single-part or multi-part HTTPS requests. Atomic operations are mapped to metadata and control structures that can be encoded as an HTTP payload (e.g., with JSON, XML, YAML). In some instances, control structures are expressed as uniform resource locator (URL) parameters or HTTP header attributes.

So, for each atomic operation (if required and supported by the specific content import/export) API), the metadata and control structures are defined such they describe the required URL scheme (e.g. necessary parameters if any), HTTP header and body as well as the expected HTTP response. So, solely based on the filename of the content file, the type of the source or target system and the technical http destination, the content file provider 220 is able to construct valid sequences of required RESTS calls (i.e. their required URLs and HTTP payloads) and interpret their responses by only having implemented once all possible translations of the metadata and control structures to URLs and HTTP payloads.

The content file provider implements the atomic operations by interpreting the set of metadata and control structures for the specific API.

In view of this, implementations of the present disclosure provide import or export definitions 224 describing the rules of accessing an import or export API. In some implementations, the import/export definitions map export/import APIs calls to an entity (e.g., an atomic operation, content metadata, a control structure). An example structure of an API mapping can include, without limitation, the following:

```
GetFile ( ) = <myRuntimeGetFile( )>
   Input
      URL parameter = none
      Payload type = json
      Enclosing tag = none
      filename = "name"
      filepath = "location"
      ...
   Output
      ...
GetError( ) = <myRuntimeGetFile( )>
   Output
      Payload type = json
      Error = "error"
      ...
```

Example Structure for API Mapping

The example describes that there is one API call to get the content file from the export API (<myRuntimeGetFile( )>). The response (=Output) of this specific GetFile( ) atomic operation returns also the error information if the export failed. So, the content file provider knows, when receiving these metadata and control structures for the content file provider to construct only one HTTP GET operation with the name <myRuntimeGetFile> without any URL parameters. The HTTP payload is json encoded, there are no enclosing tags, just the two nodes name and location in json syntac. In case of errors the atomic operation GetError( ) is executed by the content file provider as the inspection of the HTTP response payload from the previous GetFile( ) operation. The error information is then encoded in the json node named "error". Other import or export APIs have different URL schemes and payloads, but they follow the relatively simple and repetitive layout of the metadata and control structures for the small and also repetitive set of atomic operations and fully describe in a generic manner content file imports and exports.

Figure 4:
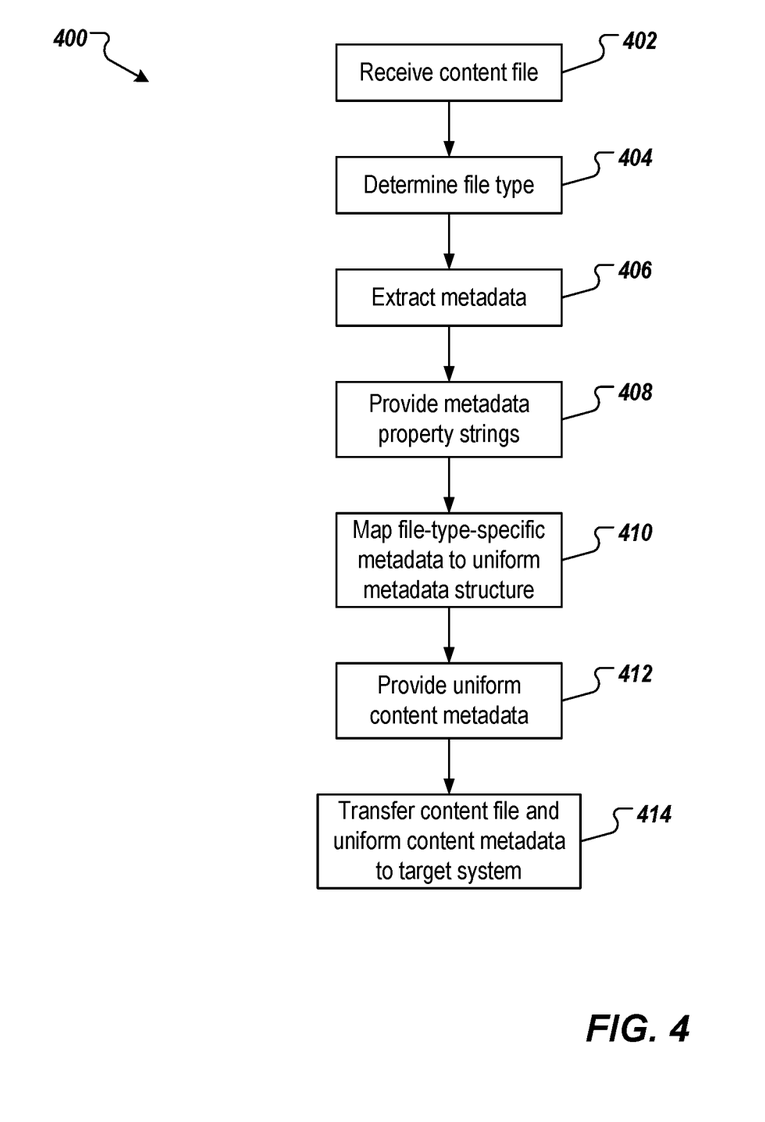
FIG. 4 depicts an example processes that can be executed in accordance with implementations of the present disclosure.

FIG. 4 depicts an example process 400 that can be executed in accordance with implementations of the present disclosure. In some examples, the example process 400 is provided using one or more computer-executable programs executed by one or more computing devices. The example process 400 can be executed for anomaly detection in accordance with implementations of the present disclosure.

A content file is received (402). For example, and as described herein, the content transfer service 202 of FIG. 2 receives the content file 230 from a source system (e.g., the content repository 206, the content authoring environment 208). A file type of the content file is determined (404). For example, and as described herein, the file type identification definition is applied to determine the file type (e.g. by file extension, magic number, file type version). The input to the file type identification definition is the content file 230, and the output is the file type (e.g., .jpeg, .pdf) of the content file. For example, the file type identification definition reads the file extension provided in a file name of the content file, maps the file extension to a file type in a set of file types, and outputs the file type.

Content metadata is extracted from the content file (406). For example, and as described herein, the metadata discovery definition is applied to find and extract the metadata within the content file 230 (e.g. the meta-inf file in .jar, a certain sequence of bytes enclosed with delimiter tags within a binary file). The input to the metadata discovery definition is the file type (from the file type identification definition) and the content file 230, and the output is a data snippet that represents the entirety of required metadata. For example, if the file type is .jpeg, the metadata discovery definition reads metadata within the APPn segment (e.g., marker 0xFF, 0xEn) and provides a data snippet that includes the metadata.

Metadata property strings are provided (408). For example, and as described herein, the metadata reading definition is applied to structure the previously retrieved metadata (i.e., the data snippet from the metadata discovery definition) to the file-type-specific metadata. That is, the metadata reading definition is applied to decompose a sequence of bytes provided in the data snippet into metadata property strings. The input to the metadata reading definition is file type and the data snippet, and the output is file-type-specific name-value pairs of the metadata.

File-type-specific metadata is mapped to a uniform metadata structure (410). For example, and as described herein, the metadata mapping definition is applied to map the file-type-specific metadata to a uniform metadata structure expected by the content transfer service. The input to the metadata mapping definition is the file type and the file-type-specific name-value pairs of the metadata, and the output is content-transfer-specific metadata. That is, the output is provided as at least a portion of the content metadata of the content file 230 in the uniform format.

Uniform content metadata is provided (412). For example, and as described herein, the output of the metadata mapping definition is stored in a content metadata file that is in the uniform (standard) format (e.g., the "Content Metadata (uniform)" of FIG. 2). Now, either the content administrator or the content transfer service (in case of fully automated scenarios) makes use of the content metadata to take the decision whether and when to initiate the import to content file to the target system (one instance of the content runtime 210). The content file is transferred to the target system(s) (414). For example, the content transfer service 202 transfers the content file to the target content run-time 210 of FIG. 2 using the generic import mechanism that allows creating and executing a call to the required, content-specific target import API. In some examples, the content file also includes its content type specific metadata).

Figure 5:
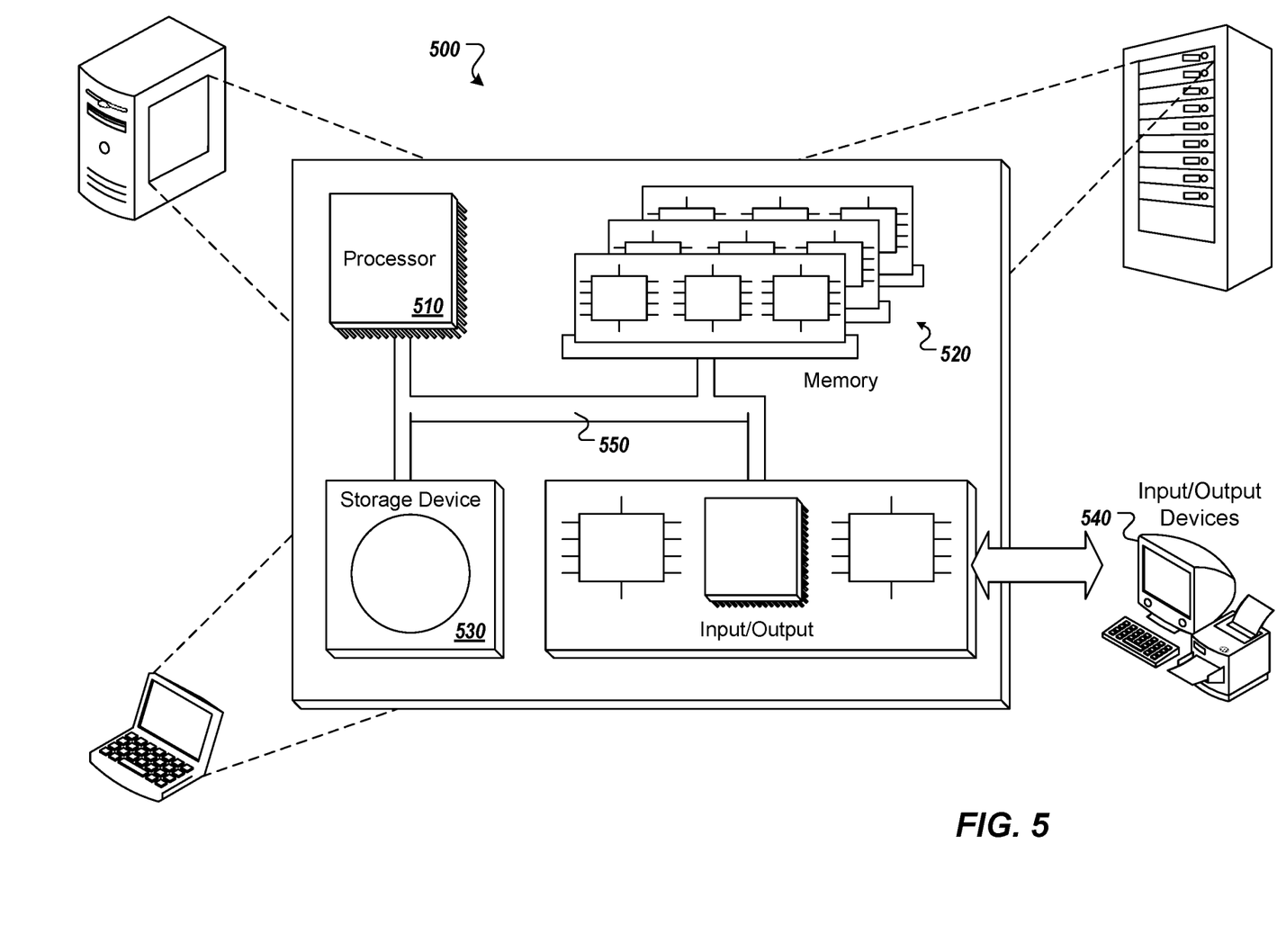
FIG. 5 is a schematic illustration of example computer systems that can be used to execute implementations of the present disclosure.

Referring now to FIG. 5, a schematic diagram of an example computing system 500 is provided. The system 500 can be used for the operations described in association with the implementations described herein. For example, the system 500 may be included in any or all of the server components discussed herein. The system 500 includes a processor 510, a memory 520, a storage device 530, and an input/output device 540. The components 510, 520, 530, 540 are interconnected using a system bus 550. The processor 510 is capable of processing instructions for execution within the system 500. In some implementations, the processor 510 is a single-threaded processor. In some implementations, the processor 510 is a multi-threaded processor. The processor 510 is capable of processing instructions stored in the memory 520 or on the storage device 530 to display graphical information for a user interface on the input/output device 540.

The memory 520 stores information within the system 500. In some implementations, the memory 520 is a computer-readable medium. In some implementations, the memory 520 is a volatile memory unit. In some implementations, the memory 520 is a non-volatile memory unit. The storage device 530 is capable of providing mass storage for the system 500. In some implementations, the storage device 530 is a computer-readable medium. In some implementations, the storage device 530 may be a floppy disk device, a hard disk device, an optical disk device, or a tape device. The input/output device 540 provides input/output operations for the system 500. In some implementations, the input/output device 540 includes a keyboard and/or pointing device. In some implementations, the input/output device 540 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier (e.g., in a machine-readable storage device, for execution by a programmable processor), and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. Elements of a computer can include a processor for executing instructions and one or more memories for storing instructions and data. Generally, a computer can also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, for example, a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

A number of implementations of the present disclosure have been described. Nevertheless, it will be understood that various modifications may be made without departing from the spirit and scope of the present disclosure. Accordingly, other implementations are within the scope of the following claims.

What is claimed is:

1. A computer-implemented method for content transfer using content management systems, the method being executed by one or more processors and comprising:

receiving, by a content transfer service of a content management system and from a source system, a first content file comprising first content and first content metadata, the first content metadata being stored in a first format;

processing the first content file to:

extract file-type-specific metadata from the first content metadata by executing a set of metadata retrieval definitions in sequence, each metadata retrieval definition comprising a computer-executable, declarative procedure executing at least one static atomic operation, and map at least a portion of the file-type-specific metadata to a first uniform content metadata file using metadata value mapping and metadata name mapping, the metadata value mapping receiving file type and file-type-specific name-value pairs to provide content-transfer-specific metadata for inclusion in the first uniform content metadata file, the metadata name mapping being used to map content-specific property names to content transfer service metadata property names for inclusion in the first uniform content metadata file, the first uniform content metadata file having a second format that is different from the first format; and transferring, by the content transfer service, the first content file and the first uniform content metadata file to a target system, the target system consuming the content at least partially based on the first uniform content metadata file.

2. The method of claim 1, wherein the set of metadata retrieval definitions comprises a file type identification definition, a metadata discovery definition, a metadata reader definition, and a metadata mapping definition.

3. The method of claim 1, wherein the content management system comprises a content file provider within the content transfer system and a content file metadata service that stores the set of metadata retrieval definitions, the content file provider communicating with the content file metadata service for processing the content file using the set of metadata retrieval definitions.

4. The method of claim 1, further comprising:
receiving a second content file comprising second content and second content metadata, the second content metadata being stored in a third format; and
processing the second content file using the set of metadata retrieval definitions to provide a second uniform content metadata file having the second format that is different from the third format.

5. The method of claim 1, wherein the metadata retrieval definition is determined for the first content file based on a file type and a content type of the first content file.

6. The method of claim 1, wherein the file-type-specific metadata is transferred to the target system with the first content file.

7. The method of claim 1, wherein the source system comprises one of a content repository and a content authoring environment.

8. A non-transitory computer-readable storage medium coupled to one or more processors and having instructions stored thereon which, when executed by the one or more processors, cause the one or more processors to perform operations for content transfer using content management systems, the operations comprising:
receiving, by a content transfer service of a content management system and from a source system, a first content file comprising first content and first content metadata, the first content metadata being stored in a first format;
processing the first content file to:
extract file-type-specific metadata from the first content metadata by executing a set of metadata retrieval definitions in sequence, each metadata retrieval definition comprising a computer-executable, declarative procedure executing at least one static atomic operation, and
map at least a portion of the file-type-specific metadata to a first uniform content metadata file using metadata value mapping and metadata name mapping, the metadata value mapping receiving file type and file-type-specific name-value pairs to provide content-transfer-specific metadata for inclusion in the first uniform content metadata file, the metadata name mapping being used to map content-specific property names to content transfer service metadata property names for inclusion in the first uniform content metadata file, the first uniform content metadata file having a second format that is different from the first format; and
transferring, by the content transfer service, the first content file and the first uniform content metadata file to a target system, the target system consuming the content at least partially based on the first uniform content metadata file.

9. The computer-readable storage medium of claim 8, wherein the set of metadata retrieval definitions comprises a file type identification definition, a metadata discovery definition, a metadata reader definition, and a metadata mapping definition.

10. The computer-readable storage medium of claim 8, wherein the content management system comprises a content file provider within the content transfer system and a content file metadata service that stores the set of metadata retrieval definitions, the content file provider communicating with the content file metadata service for processing the content file using the set of metadata retrieval definitions.

11. The computer-readable storage medium of claim 8, wherein operations further comprise:
receiving a second content file comprising second content and second content metadata, the second content metadata being stored in a third format; and
processing the second content file using the set of metadata retrieval definitions to provide a second uniform content metadata file having the second format that is different from the third format.

12. The computer-readable storage medium of claim 8, wherein the metadata retrieval definition is determined for the first content file based on a file type and a content type of the first content file.

13. The computer-readable storage medium of claim 8, wherein the file-type-specific metadata is transferred to the target system with the first content file.

14. The computer-readable storage medium of claim 8, wherein the source system comprises one of a content repository and a content authoring environment.

15. A system, comprising:
a computing device; and
a computer-readable storage device coupled to the computing device and having instructions stored thereon which, when executed by the computing device, cause the computing device to perform operations for content transfer using content management systems, the operations comprising:
receiving, by a content transfer service of a content management system and from a source system, a first content file comprising first content and first content metadata, the first content metadata being stored in a first format;
processing the first content file to:
extract file-type-specific metadata from the first content metadata by executing a set of metadata retrieval definitions in sequence, each metadata retrieval definition comprising a computer-executable, declarative procedure executing at least one static atomic operation, and
map at least a portion of the file-type-specific metadata to a first uniform content metadata file using metadata value mapping and metadata name mapping, the metadata value mapping receiving file type and file-type-specific name-value pairs to provide content-transfer-specific metadata for inclusion in the first uniform content metadata file, the metadata name mapping being used to map content-specific property names to content transfer service metadata property names for inclusion in the first uniform content metadata file, the first uniform content metadata file having a second format that is different from the first format; and
transferring, by the content transfer service, the first content file and the first uniform content metadata file to a target system, the target system consuming the content at least partially based on the first uniform content metadata file.

16. The system of claim 15, wherein the set of metadata retrieval definitions comprises a file type identification definition, a metadata discovery definition, a metadata reader definition, and a metadata mapping definition.

17. The system of claim 15, wherein the content management system comprises a content file provider within the content transfer system and a content file metadata service that stores the set of metadata retrieval definitions, the content file provider communicating with the content file metadata service for processing the content file using the set of metadata retrieval definitions.

18. The system of claim 15, wherein operations further comprise:
   receiving a second content file comprising second content and second content metadata, the second content metadata being stored in a third format; and
   processing the second content file using the set of metadata retrieval definitions to provide a second uniform content metadata file having the second format that is different from the third format.

19. The system of claim 15, wherein the metadata retrieval definition is determined for the first content file based on a file type and a content type of the first content file.

20. The system of claim 15, wherein the file-type-specific metadata is transferred to the target system with the first content file.

* * * * *